United States Patent [19]
Kelbrick et al.

[11] Patent Number: 5,537,856
[45] Date of Patent: Jul. 23, 1996

[54] FLOW RESTRICTION DETECTOR FOR A NOZZLE ASSEMBLY

[75] Inventors: William J. Kelbrick; Peter A. A. Ernst, both of Peterborough, Canada

[73] Assignee: Purity Packaging, A Division of Great Pacific Enterprises, Peterborough, Canada

[21] Appl. No.: 417,163

[22] Filed: Apr. 5, 1995

[51] Int. Cl.$^6$ .................................................. G01N 19/00
[52] U.S. Cl. ................................. 73/37; 222/23; 137/557
[58] Field of Search .................................. 73/37; 222/23, 222/148; 141/91, 94; 137/240, 241, 557

[56] References Cited

U.S. PATENT DOCUMENTS 4,430,886  2/1984  Rood ............................................. 73/37
5,040,579  8/1991  Kawamura .................................. 141/94
5,092,161  3/1992  Jenkins ........................................ 73/37

*Primary Examiner*—Hezron E. Williams
*Assistant Examiner*—Michael Brock
*Attorney, Agent, or Firm*—Ridout & Maybee

[57] ABSTRACT

A flow restriction detector for a nozzle assembly of a liquid dispensing machine is capable of detecting a blocked or partially blocked nozzle during the cleaning of the nozzle assembly. During nozzle cleaning, a return plate is attached to the nozzle plate of the nozzle assembly to receive a flow of pressurized fluid from the nozzles. Both the inlet and return fluid lines are provided with pressure sensors, and the return line has a constant back pressure applied to it so that the differential between the inlet and return line pressure sensors is in the range 5–10 psi. The pressure differential is monitored during cleaning and from one cleaning to the next for the purpose of identifying a blocked or partially blocked nozzle. A change of as little as 5% from the pressure differential value established for an unblocked system may indicate a partial blockage of a nozzle.

12 Claims, 7 Drawing Sheets 5,537,856

FLOW RESTRICTION DETECTOR FOR A NOZZLE ASSEMBLY

BACKGROUND OF THE INVENTION

1. Field of the Invention

The invention is a flow restriction detector for a nozzle assembly of a liquid dispensing machine, particularly for an edible liquid packaging machine used in the food industry.

2. Description of the Prior Art

The invention was developed for use in a machine for packaging milk or cream in small cups for use with coffee or tea. Large quantities of these milk or cream cups are used by the food service industry, which in turn require dairies to have packaging machines capable of meeting the huge demand. High speed liquid packaging machines have been developed to provide the necessary production capability for these packaged milk or cream cups under aseptic conditions. Such machines can produce 1600–2100 filled and sealed cups per minute. Obviously, it is important that a blockage or partial blockage of the flow of liquid from a nozzle of such a packaging machine be detected at an early stage. Nozzle blockages are detectable during production through the mismatched filling of cups, and a blockage during production usually requires a shut down of the run to locate and clear the obstruction. Accordingly, it would be preferable to have a means for detecting a nozzle blockage prior to a production run, and the invention addresses this need.

The cup filling station of a high speed liquid packaging machine has a nozzle assembly capable of filling a plurality of cups simultaneously as they pass rapidly beneath the nozzles. For example, a nozzle assembly may comprise an array of four rows of six nozzles, with each row being fed by a liquid distributing body in fluid communication with a central reservoir. A nozzle assembly of this design is capable of filling 24 cups simultaneously. Blockage or partial blockage of any one of the 24 nozzles in an assembly can be caused by such things as fragments from gaskets or seals entering the fill system, or simply from the buildup of butter fat or other milk solids.

SUMMARY OF THE INVENTION

The invention takes advantage of the requirement for cleaning and sterilization of the liquid dispensing apparatus between production runs by providing a means for detecting a blockage through the monitoring of the pressure differential across the nozzle assembly during the cleaning and sterilization process. The invention provides an apparatus for detecting a flow restriction in a nozzle assembly of a liquid dispensing machine, wherein the nozzle assembly has a liquid distribution body with an inlet for receiving liquid and a plurality of outlets in fluid communication with a plurality of nozzles located in a nozzle plate. The flow restriction detector comprises, a liquid supply line connected to the inlet of the distribution body; and a return plate having an outlet which plate is attachable in sealing relation to the nozzle plate for receiving a flow of pressurized liquid from the nozzles. A return line is connected to the outlet of the return plate, and pressure sensors are provided in the supply and return lines to measure the liquid pressures in those lines. The return line is provided with a sufficient constant back pressure to establish a pressure differential between the inlet and outlet pressure sensors in the range 5–10 psi (preferably 7–9 psi), with the pressure in the supply line being greater.

The invention also provides a method for detecting a restricted flow of liquid through a nozzle assembly of a liquid dispensing machine in which liquid flows through a supply line to the nozzle assembly having a liquid distribution body with an inlet connected to the supply line for receiving liquid and a plurality of outlets in fluid communication with a plurality of nozzles located in a nozzle plate; and a return plate having an outlet being sealingly attached to the nozzle plate for receiving liquid from the nozzles which flows through the outlet having a return line attached to it. The method comprising the steps of:

(a) measuring the liquid pressures in the supply and return lines;

(b) providing a back pressure to the return line so that the pressure differential between the supply and return lines is in the range 5–10 psi, the pressure in the supply line being higher; and (c) monitoring the pressure differential to detect a blockage or partial blockage in the nozzle assembly.

Preferably, the monitoring of the pressure differential is done electronically by means of a programmable controller which is provided with a preset acceptable range for the pressure differential. In order to monitor changes in the pressure differential from one cleaning procedure to another, it is preferred to monitor the differential as a percentage of the inlet pressure. In fact, many blockages are detected from a change in this percentage upon the start of a clean-in-place procedure.

DESCRIPTION OF THE PREFERRED EMBODIMENT

The invention will be described in relation to an edible liquid packaging machine having a plurality of nozzles arrayed linearly for filling a plurality of cups simultaneously. A preferred machine has a nozzle assembly provided with 20–24 nozzles arranged in four rows of five or six nozzles each, thereby having the capability of filling 20–24 cups simultaneously. Such a machine is described in U.S. Pat. No. 4,563,855, and is shown generally in FIG. 1. The invention has particular advantages in relation to an aseptic packaging machine since the sterility of the machine environment can be maintained during the process of the invention. The skilled person will understand, however, that the invention may be applied to a variety of nozzle systems whether or not used in an aseptic machine environment, and accordingly, the invention has a general applicability. As the embodiment of the invention described herein applies to each row of nozzles in a liquid packaging machine of the type shown in FIG. 1, the preferred embodiment will be described in relation to one such row of six nozzles.

Figure 1:
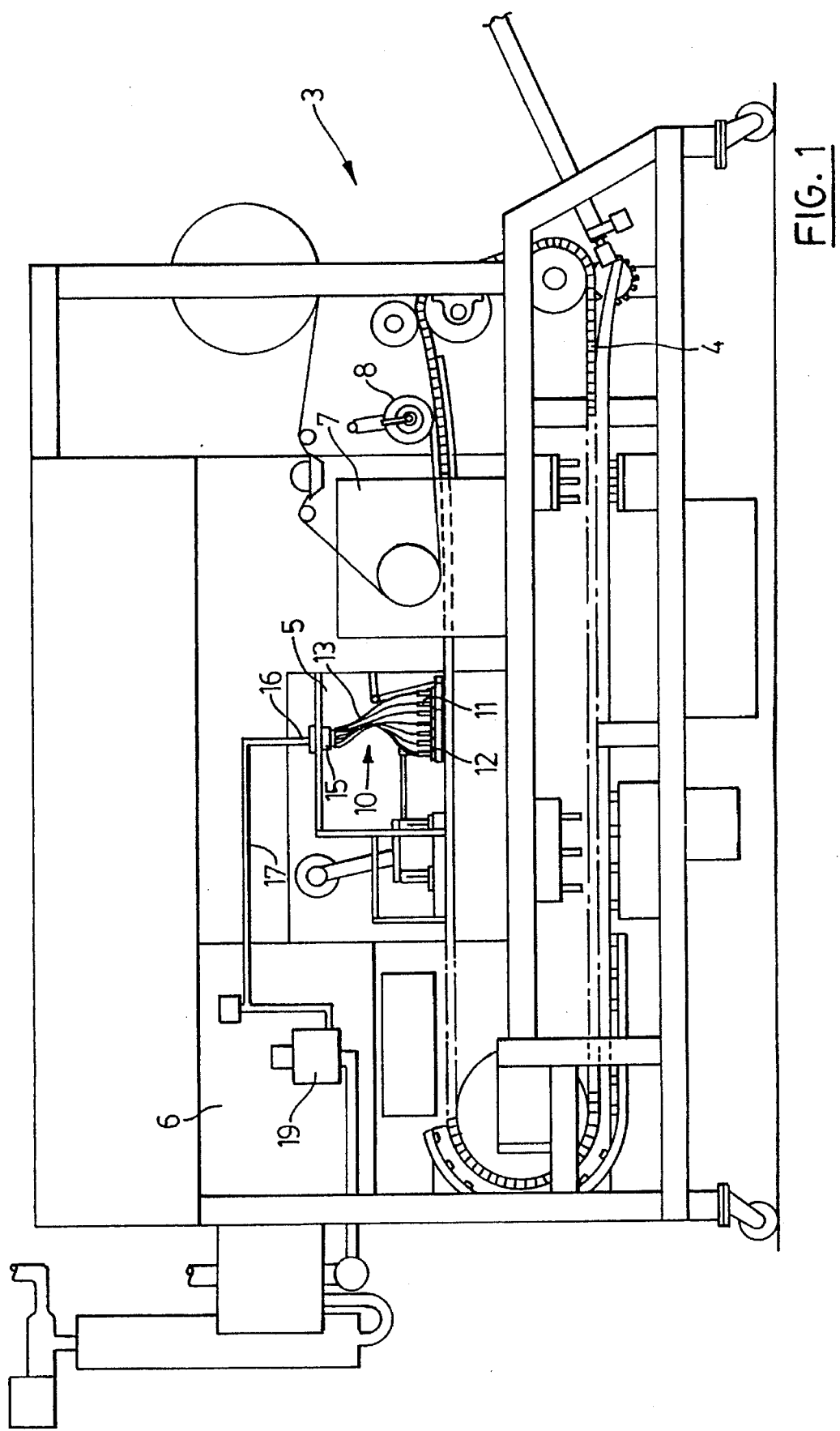
FIG. 1 is a side elevation of a high speed liquid packaging machine having a fill station with a nozzle assembly and with a return plate for the clean-in-place procedure being in its stored position.

As seen in FIG. 1, a liquid packaging machine 3 has several work stations which in a machine for packaging an edible liquid can be isolated from one another to provide aseptic conditions for packaging. Thus, cups are loaded onto a lower conveyer 4 where they are sterilized and conveyed to a fill station 5 where the edible liquid is dispensed through nozzles supplied by a liquid pumping station 6. The filled cups proceed to a lidstock sealing station 7 where sterile lids are applied using roll form stock which is severed at a cutting wheel 8 located near the exit point of the machine 3.

A nozzle assembly 10 of a packaging machine 3 has four rows of six nozzles 11 positioned in a nozzle plate 12. The nozzles 11 of each row are provided with a flow of liquid through hoses 13 connecting the nozzles 11 to outlets 14 of a liquid distributor block 15. The distributor block 15 is supplied with liquid through an inlet 16 by means of a line 17 and a pump 19.

Figure 2:
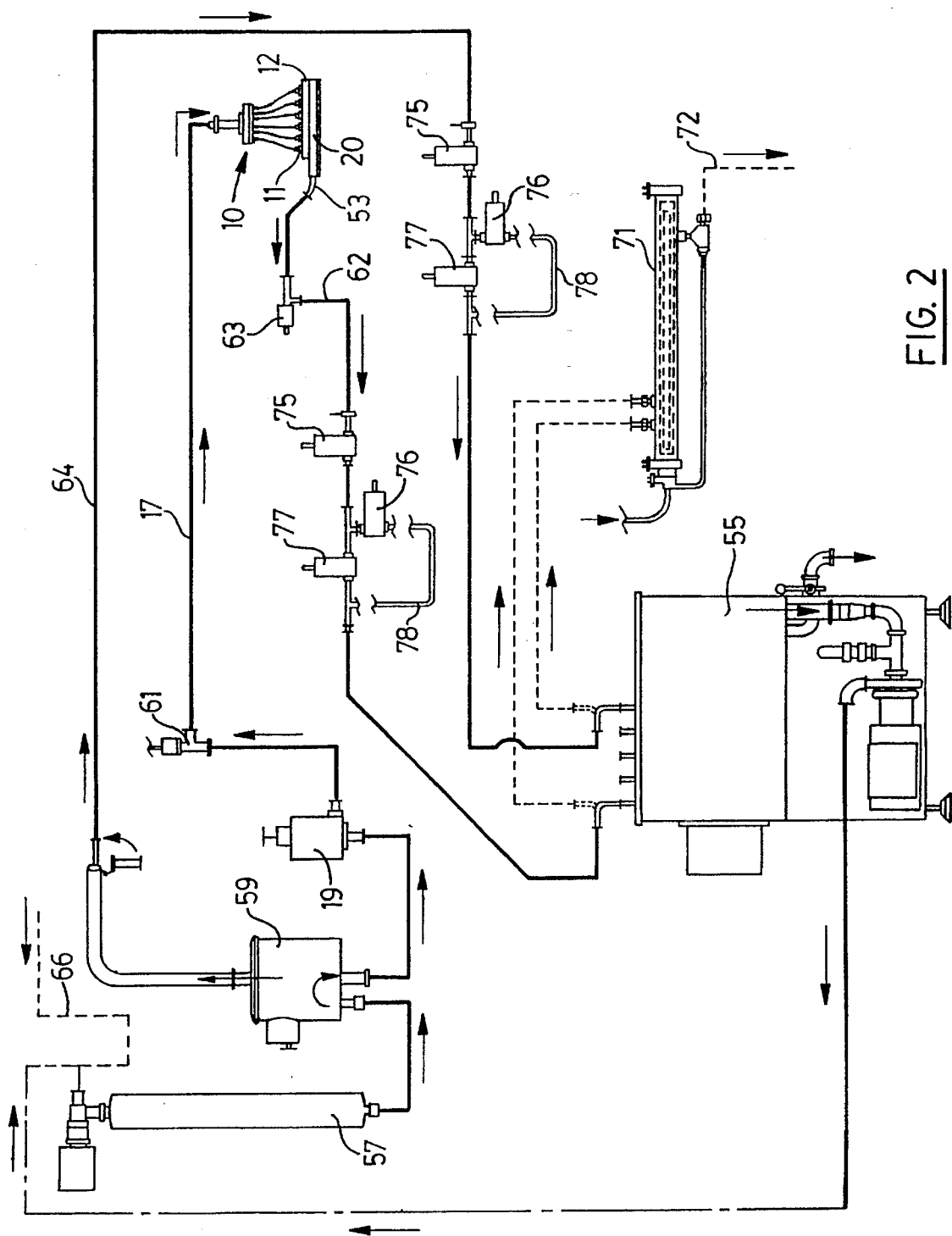
FIG. 2 is a schematic diagram of the system components for the clean-in-place procedure.

The nozzle assembly 10 is periodically cleaned between production runs, and the cleaning can be accomplished under aseptic conditions using the built-in clean-in-place system of the packaging machine. The clean-in-place system is schematically shown in FIG. 2.

Figure 3:
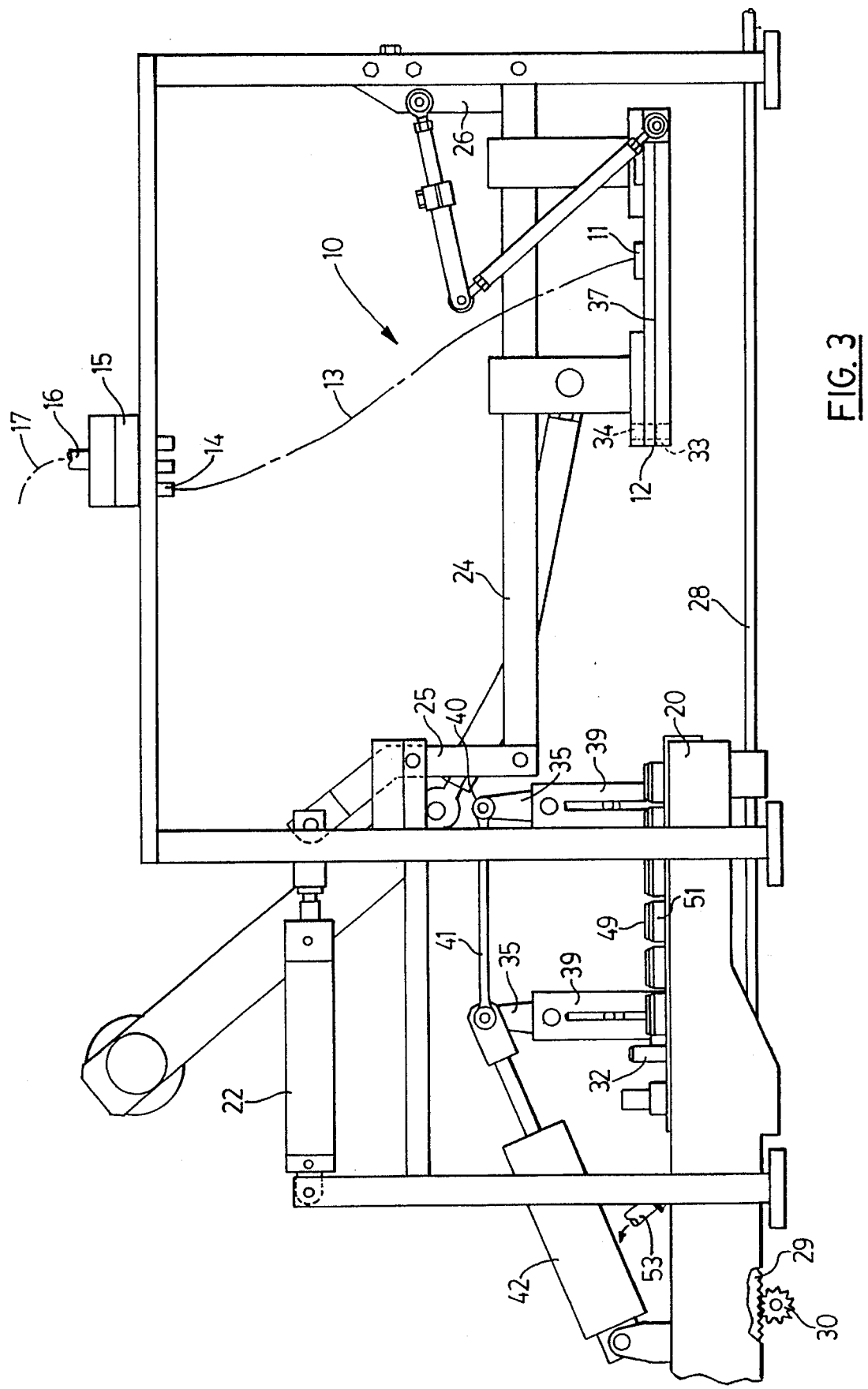
FIG. 3 is a side elevation of the fill station of the machine of FIG. 1.
Figure 4:
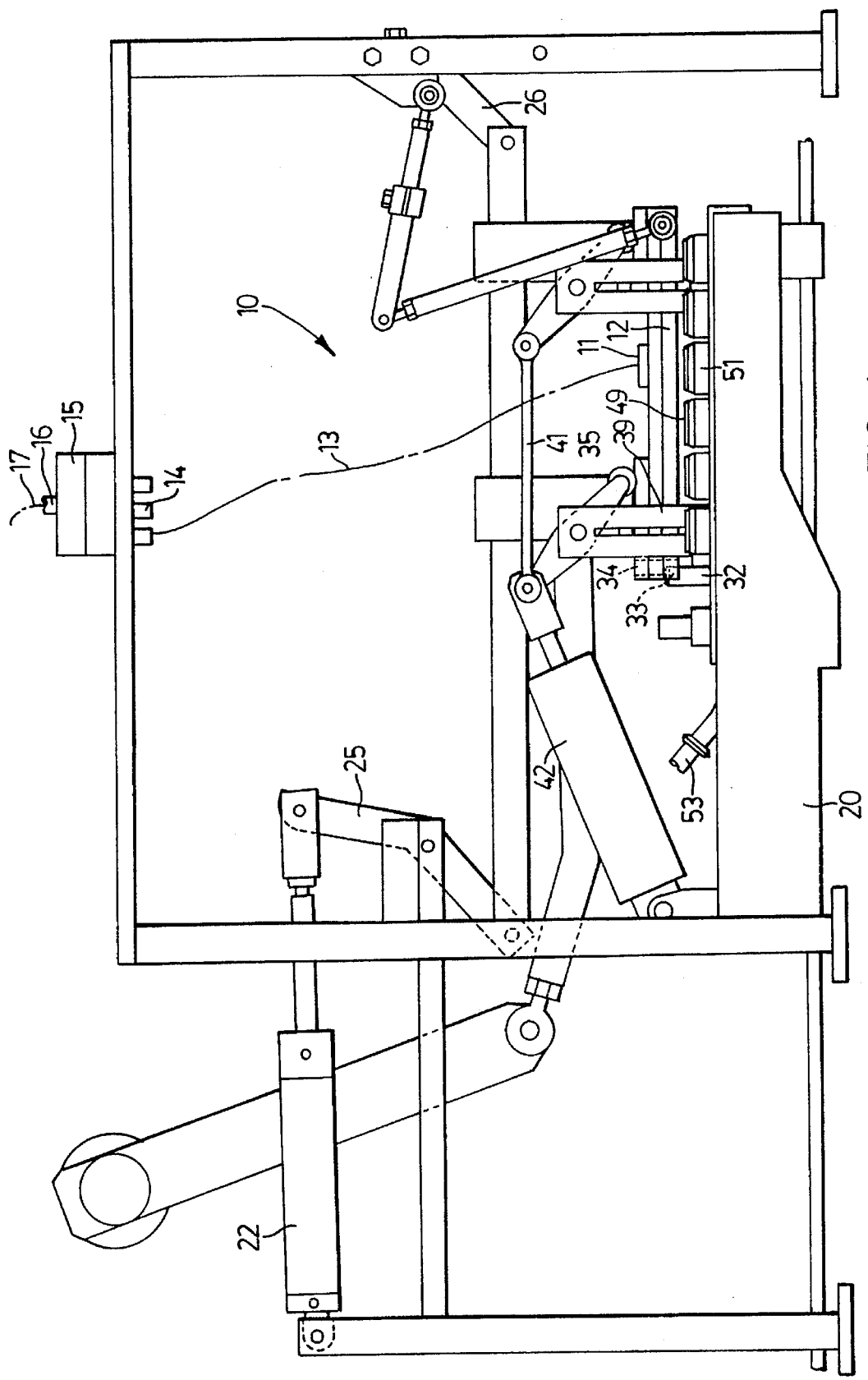
FIG. 4 is a side elevation of the fill station of FIG. 3 with the return plate positioned beneath the nozzle assembly.
Figure 5:
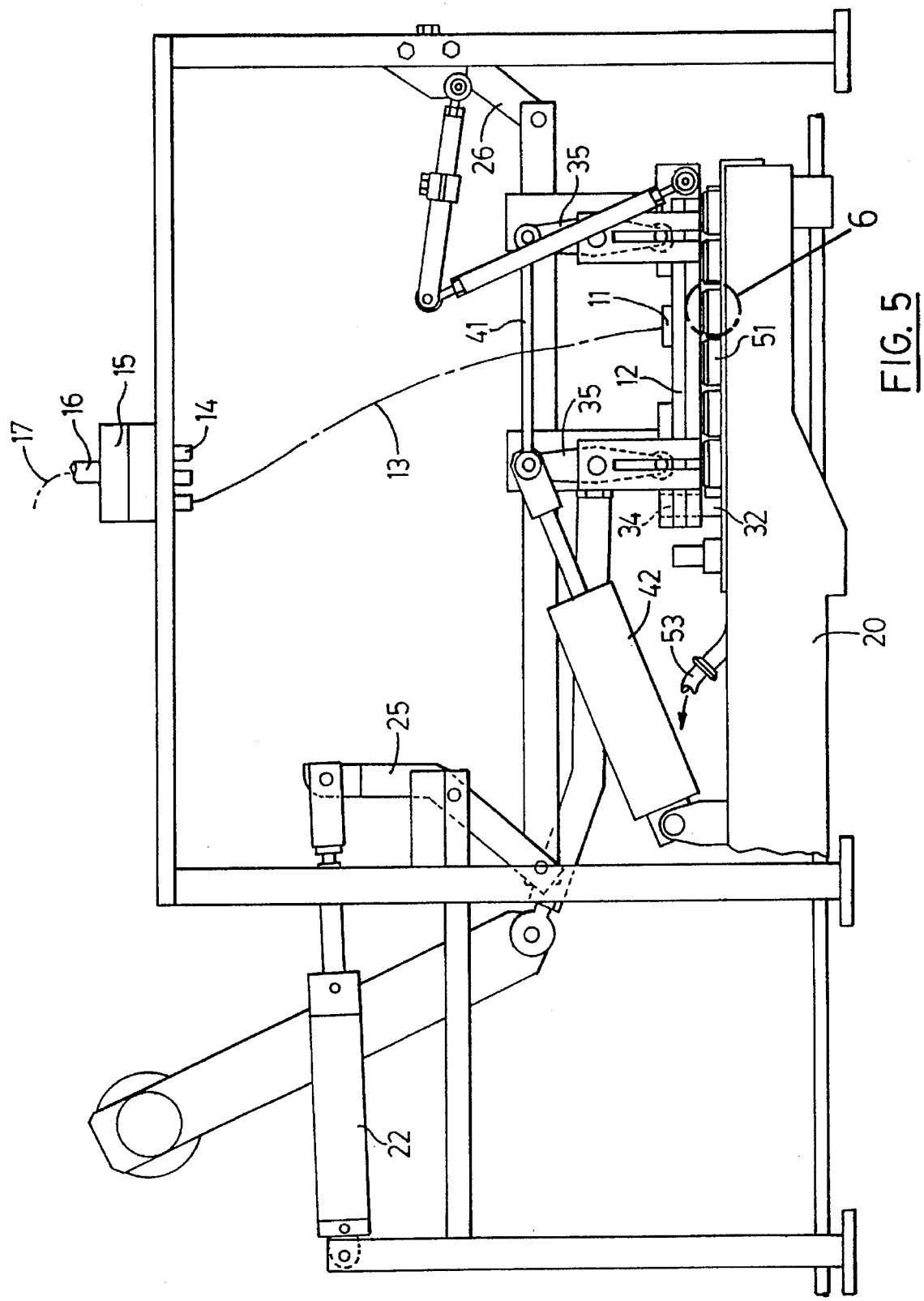
FIG. 5 is a side elevation of the fill station of FIG. 3 with the return plate attached to the nozzle assembly for the clean-in-place procedure.

The first step in the clean-in-place procedure is the coupling of a return plate 20 to the nozzle plate 12. This step is accomplished as illustrated in FIGS. 3–5 by raising the nozzle plate 12 from its cup filling position by activating a pneumatic cylinder 22. The nozzle plate 12 is slidably attached to a rail 24 having linkage arms 25 and 26 pivotally attached at either end. The expansion of the cylinder 22, which is attached to the arm 25, causes the nozzle plate 12 to be raised as shown in FIG. 4. The return plate 20 is moved into place along a rail 28 to a location directly beneath the nozzle plate 12 by a transport means operated outside of the packaging machine 3. A suitable transport means is a manually operated rack 29 and pinion 30 arrangement as shown in FIG. 3. The correct positioning of the return plate 20 beneath the nozzle plate 12 is ensured by providing upright stop pins 32 atop the return plate 20 which pass through slots 33 in the nozzle plate 12 as the return plate 20 is moved beneath it. For simplicity this arrangement is shown for one pin 32 and one slot 33 in FIGS. 3–5. At the end of the slots 33, the pins 32 engage the nozzle plate 12 thereby correctly positioning it for the coupling step (FIG. 4). At the end of each slot 33, the nozzle plate 12 has a hole 34 for receiving a pin 32 when the plates 12 and 20 are clamped together (FIG. 5).

As the return plate 20 is moved into position, roller toggles 35 engage the top surface 37 of the nozzle plate 12. The roller toggles 35 are pivotally connected to upright supports 39 attached to the return plate 20, and are pivotally linked together at their upper ends 40 by a linkage arm 41. When the return plate 20 is correctly positioned beneath the nozzle plate 12, the roller toggles 35 are activated by a pneumatic cylinder 42 which is attached to the linkage arm 41. Vertical alignment of the roller toggles 35 by the cylinder 42 mechanically clamps the nozzle plate 12 to the return plate 20 (FIG. 5).

Figure 6:
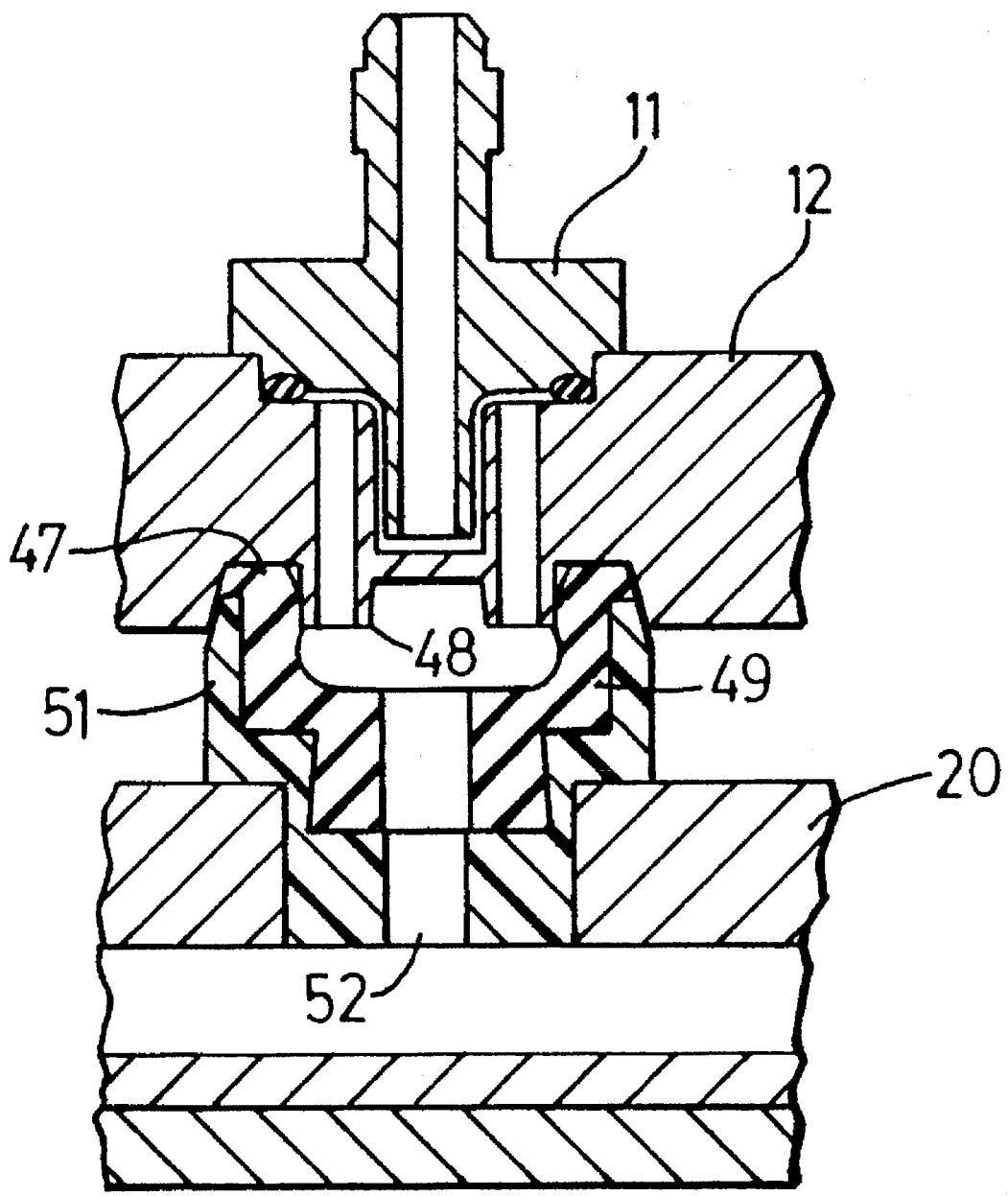
FIG. 6 is a cross sectional detail taken at station 6 of FIG. 5 showing the sealing arrangement of a nozzle and a return plate cup.

As shown in FIG. 6, each nozzle 11 has an annular recess 47 about its outlet 48. The return plate 20 has a plurality of cups 51 for engaging the nozzles 11 when the two plates are clamped together. Each cup 51 is made of a rigid material such as steel, and is shaped to receive an elastomeric annular seal 49, the upper surface of which seats into the recess 47 of the nozzle 11 when the nozzle plate 12 and the return plate 20 are clamped together. Each cup 51 has an opening 52 through its bottom to provide flow communication from the associated nozzle 11 to a fluid outlet 53 for the return plate 20.

FIG. 2 is a schematic representation of a clean-in-place and sterilization system for the packaging machine 3. With the nozzle plate 12 and the return plate 20 clamped together, a cleaning solution is pumped from the clean-in-place tank 55, through the strainer 57 and the balance tank 59 to the pump 19. The vent 60 of the balance tank 59 is connected to the line 64 which returns solution directly to the tank 55. The diaphragm pump 19 is pulsed to ensure that the cleaning solution contacts all internal operating surfaces.

As the solution proceeds from the pump 19 through the line 17 to the nozzle assembly 10, the fluid pressure is measured by a pressure sensor 61 located in the line 17 between the pump 19 and the nozzle assembly 10. During the clean-in-place procedure, this fluid inlet pressure is about 35 psi. The cleaning solution flows through the nozzles 11 and drains into the return plate 20. The solution exits the return plate 20 through the outlet 53 and into the line 62 which returns the solution to the clean-in-place tank 55. A second pressure sensor 63 is located in the line 62 to measure the fluid pressure in that line. Preferably, the pressure sensors 61 and 63 are electronic devices which are capable of trasmitting a signal to a controller or recorder. As described below, the blockage detection method of the invention requires that the line 62 be provided with a back pressure so that the pressure differential between the inlet and outlet fluid pressures as measured by the pressure sensors 61 and 63 is in the range 5–10 psi, with 7–9 psi being more preferred. The back pressure in the line 62 can be provided by a variety of means such as a valve or constrictor, but the simplest and preferred means for providing a constant back pressure in the line 62 is to elevate the line 62 about ten feet above the pressure sensor 63. This elevation of the line 62 necessarily occurs outside of the machine cabinet, and therefore, would normally involve the elevation of that portion of the line 62 which extends beyond the pinch valves 75, 76 and 77, the function of which are discribed below.

The schematic diagram of FIG. 2 also shows the fluid flow arrangement for sterilization of the liquid fill components using pressurized superheated water. Thus, water heated to about 300° F. (about 150° C.) is introduced into the strainer 57 through the line 66 at a pressure of 40–50 psig. As with the clean-in-place procedure, the pressurized hot water flows through the balancing tank 59, the pump 19 and the pressure sensor 61 before it enters the joined nozzle and return plates 12 and 20. Upon exiting the return plate 20 through the line 62, the hot water passes through the pressure sensor 63, and as with the clean-in-place procedure, the line 62 is maintained with a constant back pressure, preferably by elevating the line. Hot water also flows through the line 64 from the vent of the balance tank 59. Both lines 62 and 64 extend to a condenser or heat exchanger 71 where the hot water is cooled before exiting the system at the drain line 72.

Both lines 62 and 64 are equipped with a triple pinch valve arrangement located outside of the sterile cabinet of the machine 3. The pinch valves 75, 76, and 77 provide a means for draining sterilizing fluid from the system lines and components used in a production run. Thus, during the clean-in-place and sterilization steps, the valve 76 operating the drain for each line 62 and 64 is connected into its respective line by a pipe 78. During clean-in-place and sterilization, all valves 75, 76, and 77 are open to provide a thorough cleaning of them. Upon completion of sterilization, the pinch valves 75, 76, and 77 are all closed, and the pipe 78 is removed. Prior to the next production run, the valves 75 and 76 are opened and product is pumped through the system to purge it of sterilization fluid. When the purge is complete, the line 64 is disconnected from the vent of the balance tank 59, and the return plate 20 is uncoupled from the nozzle plate 12 and returned to its stored position. The machine 3 may then commence a production run.

Figure 7:
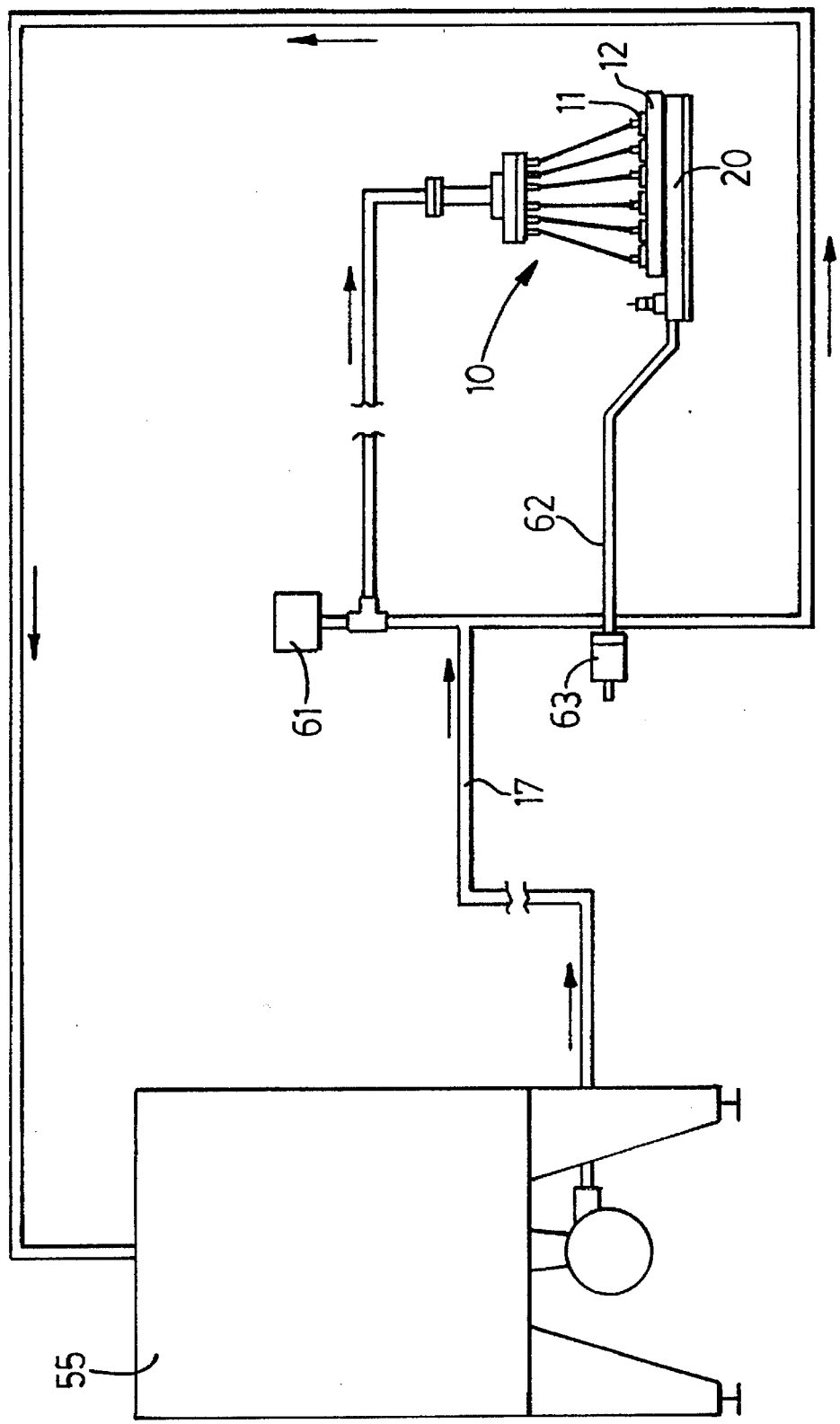
FIG. 7 is a schematic diagram of the main components of the invention.

Referring to FIG. 7, the invention allows for the detection of a blockage or partial blockage of a nozzle 11 during the clean-in-place and sterilization procedures in the following manner. Solution from the clean-in-place tank 55, or externally supplied hot pressurized water, is pumped through the supply line 17 to the nozzle assembly 10. The inlet pressure of the supply line 17 is monitored by the pressure sensor 61. The fluid flows through the nozzles 11 in the plate 12, the cups 51 in the return plate 20 and into the return line 62 where the outlet pressure of the fluid is measured by the pressure sensor 63. The monitoring of the differential between the inlet and outlet pressures provides a basis for detecting the blockage of one or more of the six nozzles 11 in the fluid flow circuit.

As the inlet pressure measured by the sensor 61 is typically about 35 psig, it is necessary to provide a back pressure in the return line 62 in the range of 25–30 psig in order to obtain a pressure differential between the readings at the sensors 61 and 63 of 5–10 psi. By expressing the pressure differential as a percentage of the inlet pressure, an automated monitoring of the system can be set up to warn the operator of a potential blockage if the percentage differential varies by a set amount. The method of the invention is illustrated by the following example.

EXAMPLE

In a nozzle assembly 10, one hose 13 connecting the distributor block 15 and a nozzle 11 of a row of six nozzles 11 was equipped with a metering valve capable of moving from a fully opened to a fully closed position upon nine revolutions of the valve handle. The return line 62 was elevated approximately 10 feet above the outlet 53 of the return plate 20 to provide sufficient back pressure at the sensor 63. The following data was generated during the test.

These data indicate that for a change in the total cross sectional area of the six hoses 13 of 3.13%, there was a corresponding change in the differential pressure of 19.9% and a change in the differential pressure as a percentage of the input pressure (% $P_i$) of 4.11. Thus, a change in the differential pressure on the order of 5% or more from the value established in an unblocked nozzle assembly of six nozzles would indicate at least a partial blockage had occurred.

It should be noted that the cross sectional area of a hose 13 is $2.14 \times 10^{-2}$ sq. in. and that the cross sectional area of the fully open valve is $5.33 \times 10^{-3}$ sq. in. Thus, the fully open valve represents a partial blockage of 75.1% of the hose in which it is installed. The data, therefore, cover a blockage range for the hose having the valve of 81–100%. As a practical matter, a blockage in a hose 13, a nozzle 11 or other fill component will substantially reduce the flow of fluid from the nozzle 11 affected so that a change in the pressure differential of the magnitude illustrated by the example will occur. Accordingly, the invention provides a simple but accurate means for identifying a blockage in a linear array of nozzles prior to the start of a new production run. Identifying a blockage during cleaning or sterilization is far preferable to the situation where production must be interrupted because of a blocked nozzle. While a partial disassembly of the of the nozzle assembly 10 is needed to clear any blockage, it is much preferred to take the affected components apart when the machine is not in the midst of a production run.

We claim:

1. A flow restriction detector for a nozzle assembly of a liquid dispensing machine, said nozzle assembly having a liquid distribution body with an inlet means for receiving liquid and a plurality of outlet means in fluid communication with a plurality of nozzles located in a nozzle plate; the flow restriction detector comprising:

a liquid supply line connected to the inlet means for the distribution body;

a return plate having an outlet means, the return plate being attachable in sealing relation to the nozzle plate for receiving a flow of pressurized liquid from the nozzles;

a return line connected to the outlet means for the return plate;

inlet pressure sensing means in the supply line for measuring the liquid pressure in the supply line; and

TABLE 1

| valve handle turns open | valve open area (sq. in) $\times 10^{-3}$ | inlet press. (psig) $P_i$ | outlet press. (psig) $P_o$ | diff. press. (psid) $\Delta P$ | % $P_i$ $\Delta P \times 100 / P_i$ | % total hose area with restr. inst'd |
|---|---|---|---|---|---|---|
| zero | zero | 34.025 | 25.750 | 8.275 | 24.32 | 83.333 |
| 0.5 | 2.435 | 34.025 | 26.325 | 7.700 | 22.63 | 85.238 |
| 1.0 | 2.592 | 34.025 | 26.400 | 7.625 | 22.41 | 85.355 |
| 1.5 | 2.670 | 34.125 | 26.525 | 7.600 | 22.27 | 85.417 |
| 2.0 | 2.827 | 34.125 | 26.575 | 7.550 | 22.13 | 85.542 |
| 2.5 | 2.992 | 34.125 | 26.625 | 7.500 | 21.98 | 85.667 |
| 3.0 | 3.118 | 34.125 | 26.650 | 7.475 | 21.91 | 85.768 |
| 3.5 | 3.267 | 34.150 | 26.675 | 7.475 | 21.89 | 85.885 |
| 4.0 | 3.416 | 34.150 | 26.700 | 7.450 | 21.82 | 86.002 |
| 5.0 | 3.691 | 34.150 | 27.100 | 7.050 | 20.64 | 86.212 |
| 5.5 | 3.834 | 34.150 | 27.150 | 7.000 | 20.50 | 86.321 |
| 6.0 | 4.006 | 34.150 | 27.250 | 6.900 | 20.21 | 86.461 | outlet pressure sensing means in the return line for measuring the liquid pressure in the return line; the return line being provided with a sufficient constant back pressure to establish a pressure differential between the inlet and outlet pressure sensing means in the range 5–10 psi, with the pressure in the supply line being greater.

2. A flow restriction detector as claimed in claim 1, wherein the nozzle plate has at least five nozzles.

3. A flow restriction detector as claimed in claim 1, wherein the nozzle plate has 24 nozzles arrayed in four rows of six nozzles each, each row of nozzles being supplied by a separate supply line, the return plate having a separate outlet connected to a separate return line for each row, and each supply and return line having a pressure sensing means.

4. A flow restriction detector as claimed in claim 1, wherein the return line is provided with constriction means for establishing a back pressure in the line.

5. A flow restriction detector as claimed in claim 1, wherein the return line is elevated above the outlet of the return plate to provide the desired back pressure in the return line.

6. A flow restriction detector as claimed in claim 1, wherein the pressure sensing means are electronic pressure sensors.

7. A method for detecting a restricted flow of liquid through a nozzle assembly of a liquid dispensing machine in which liquid flows through a supply line to the nozzle assembly which has a liquid distribution body with an inlet connected to the supply line for receiving liquid and a plurality of outlets in fluid communication with a plurality of nozzles located in a nozzle plate; a return plate having an outlet is sealingly attached to the nozzle plate for receiving liquid from the nozzles which flows through the outlet having a return line attached to it, the method comprising the steps of:

(a) measuring the liquid pressures in the supply and return lines;

(b) providing a back pressure to the return line so that the pressure differential between the supply and return lines is in the range 5–10 psi, the pressure in the supply line being higher; and (c) monitoring the pressure differential to detect a blockage or partial blockage in the nozzle assembly.

8. A method as claimed in claim 7, wherein the pressure differential between the supply and return lines is in the range 7–9 psi.

9. A method as claimed in claim 7, wherein the pressure differential is monitored electronically.

10. A method as claimed in claim 7, wherein the pressure differential as a percentage of the inlet pressure is monitored.

11. A method as claimed in claim 7, wherein a nozzle assembly having five or six nozzles is monitored for a change in the pressure differential.

12. A method as claimed in claim 11, wherein the change in the pressure differential is at least 5% from the value established by a fully unblocked nozzle assembly.

* * * * *